J. DARLING.
Railway Car-Trucks.

No. 144,389.

Patented Nov. 11, 1873.

WITNESSES.
Henry N. Miller

INVENTOR
Jesse Darling
By Alexander Mason
Attorneys.

UNITED STATES PATENT OFFICE.

JESSE DARLING, OF WHISTLER, ALABAMA.

IMPROVEMENT IN RAILWAY-CAR TRUCKS.

Specification forming part of Letters Patent No. 144,389, dated November 11, 1873; application filed August 31, 1872.

*To all whom it may concern:*

Be it known that I, JESSE DARLING, of Whistler, in the county of Mobile and State of Alabama, have invented certain new and useful Improvements in the Construction of Railroad-Cars; and I do hereby declare the following to be a full, clear, and exact description thereof, reference being had to the accompanying drawing and to the letters of reference marked thereon.

The nature of my invention consists in the construction and arrangement of the running-gear of a railroad-car, as will be hereinafter more fully set forth.

In order to enable others skilled in the art to which my invention appertains to make and use the same, I will now proceed to describe its construction and operation, referring to the annexed drawing which forms a part of this specification, and in which—

Figure 1:
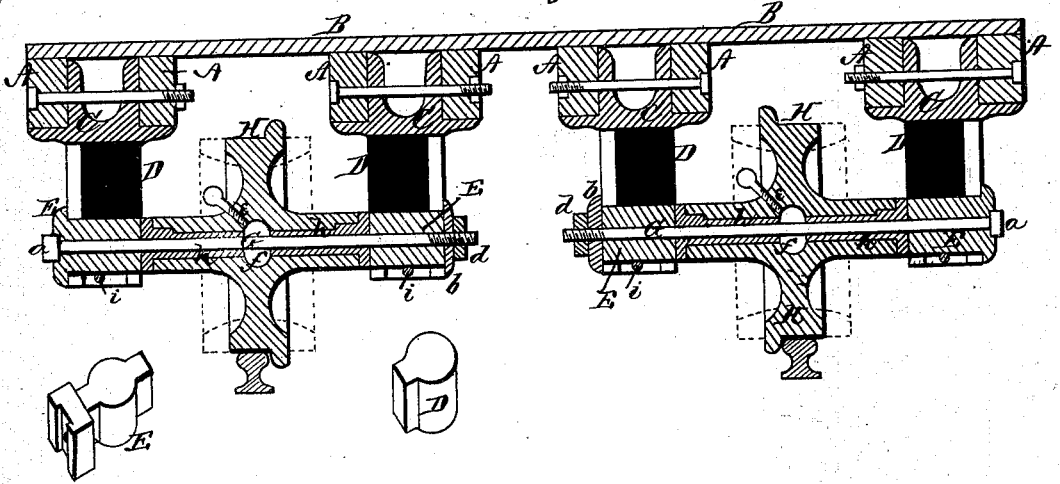
Figure 2:
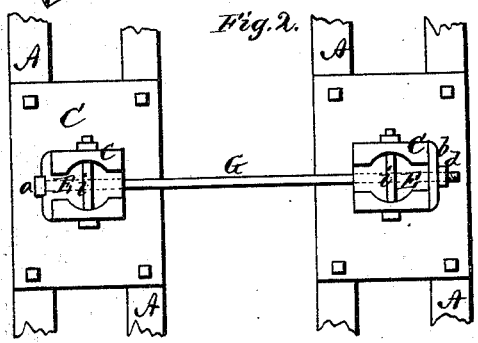
Figure 3:
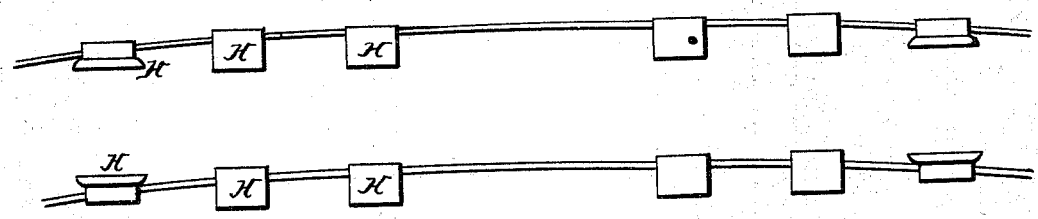

Figure 1 is a cross-section through the centers of one pair of wheels. Fig. 2 is a bottom view of one pair of spring-seats, showing the axle with the wheel removed; and Fig. 3 represents a short curve of the railroad-track, showing the position of the wheels on the same.

A A represent the joists or sills running the entire length of the car, and having the floor B laid crosswise on and firmly nailed or bolted to the same. To the under side of the joists or sills A A are secured pedestals C C, in each of which is a spring, D, and spring-seat E. Through the spring-seats E E passes a fixed axle, G, around which the wheel H revolves. Each axle G has a head, *a*, at one end sunk into the spring-seat E to prevent the axle from turning, and at the other end of the axle is a washer, *b*, and nut *d*, to keep the axle straight and in its place. The spring-seats E E slide up and down in the pedestals C C as the springs D D are compressed or expand. Of the wheels H H only one pair nearest each end of the car has flanges to guide and keep the car on the track, while all the wheels between the end pairs have no flanges but wide faces, as shown by Fig. 3 and by dotted lines in Fig. 1, to keep the central wheels from getting off the track in going around curves. Any number of pairs of wheels may be used to suit the length of the car; short cars of three or four pairs of wheels may be used as engine-tender trucks, and the running-gear of railroad horse-cars. Each wheel H is provided in the center of its hub with an oil-well, *f*, into which are made three holes or passages, *e*, equidistant from each other, so that the wheel can be oiled either side up. To prevent the oil from running out these holes have threads cut in them and thumb-screws to fit them, as shown in Fig. 1. Each wheel is provided with two pipe-boxes, *h h*, put in from each end of the hub and reaching to the oil-well *f*. *i i* represent bolts passing through the pedestals C C to keep the wheels in their places, so that they will not come detached in case of accidents.

Some of the advantages of the construction of a railroad-car are as follows: It gives double leverage to overcome the friction on the axles, lessening materially the power required to move a given load. They are stronger, because each pair of wheels supports every joist when placed under the car. They will cost less to make and to keep in repair; are lighter in proportion to the weight they will carry. They will pass around a curve easier, around a smaller curve than others, and are safer and easier to ride in.

Having thus fully described my invention, what I claim as new, and desire to secure by Letters Patent, is—

The combination, in a railroad-car, of the frame A B, pedestals C, springs D, spring-seats E, fixed axles G, and wheels H, all constructed and arranged substantially as shown and described, and for the purposes set forth.

JESSE DARLING.

Witnesses:
 JOHN BROBAZON,
 F. H. HANLEY.